US011859711B2

United States Patent
Kim et al.

(10) Patent No.: US 11,859,711 B2
(45) Date of Patent: Jan. 2, 2024

(54) AUTOMOTIVE TRANSMISSION AND OPERATING METHOD FOR THE SAME

(71) Applicant: SL Corporation, Daegu (KR)

(72) Inventors: Hyungyeul Kim, Gyeongsan-si (KR); Jeongho Park, Gyeongsan-si (KR); Youngern Jung, Gyeongsan-si (KR); Byungki Ji, Gyeongsan-si (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 17/972,697

(22) Filed: Oct. 25, 2022

(65) Prior Publication Data

US 2023/0151885 A1 May 18, 2023

(30) Foreign Application Priority Data

Nov. 12, 2021 (KR) .................. 10-2021-0155830

(51) Int. Cl.
| | |
|---|---|
| *F16H 59/08* | (2006.01) |
| *F16H 61/32* | (2006.01) |
| *B60Q 3/70* | (2017.01) |
| *F16H 61/28* | (2006.01) |
| *F16H 59/74* | (2006.01) |

(52) U.S. Cl.
CPC .............. *F16H 59/08* (2013.01); *B60Q 3/70* (2017.02); *F16H 61/32* (2013.01); *F16H 2059/746* (2013.01); *F16H 2061/2884* (2013.01); *F16H 2061/326* (2013.01)

(58) Field of Classification Search
CPC ....... F16H 2061/326; F16H 2061/2884; F16H 2059/746; F16H 59/08; F16H 2059/0291; B60Q 3/70
See application file for complete search history.

(56) References Cited

U.S. PATENT DOCUMENTS

| 10,704,670 B2 * | 7/2020 | Kim .................... F16H 59/0204 |
| 10,731,750 B2 * | 8/2020 | Wang ...................... F16H 61/22 |
| 2007/0204718 A1 * | 9/2007 | Strait ........................ G05G 5/06 |
| | | 74/523 |

FOREIGN PATENT DOCUMENTS

KR 20120001949 A * 1/2012

OTHER PUBLICATIONS

Bimmerfest (Jul. 15, 2007) (Year: 2007).*
Honda Owner's Manual (2017) (Year: 2017).*

* cited by examiner

*Primary Examiner* — Gregory Robert Weber
(74) *Attorney, Agent, or Firm* — United One Law Group LLC; Kongsik Kim; Jhongwoo Peck

(57) ABSTRACT

A transmission device for a vehicle includes a vehicle state detector for detecting a vehicle state, a transmission operation unit for enabling a transmission operation of selecting one of a plurality of transmission stages, and a position adjusting unit for adjusting a position of the transmission operation unit based on the detected vehicle state to allow the transmission operation unit to slidingly move between a first position where a transmission operation is disabled and a second position where a transmission operation is enabled.

20 Claims, 14 Drawing Sheets

AUTOMOTIVE TRANSMISSION AND OPERATING METHOD FOR THE SAME

CROSS-REFERENCE TO RELATED APPLICATION(S)

This application claims priority from Korean Patent Application No. 10-2021-0155830, filed on Nov. 12, 2021, which is incorporated herein by reference in its entirety.

BACKGROUND

1. Technical Field

The present disclosure relates to a transmission device for a vehicle and an operating method thereof, and more particularly, to a vehicle transmission device capable of easily recognizing vehicle's state via a transmission operation unit, and an operating method thereof.

2. Description of the Related Art

A transmission device may adjust a gear ratio to keep the engine at a particular rotational speed based on the speed of the vehicle, and the driver operates the transmission lever to change the gear stage of the transmission.

As the transmission mode of the transmission device, there are a manual transmission mode, in which the driver can manually switch transmission stages, and an automatic transmission mode, in which a gear ratio is automatically switched based on the vehicle speed when the driver selects the driving stage (D).

In addition, a sports mode capable of performing manual transmission and automatic transmission in one transmission device is also being used. Since a transmission device capable of manual transmission is provided in addition to a transmission device that performs automatic transmission, the sports mode primarily performs automatic transmission while allowing the driver to perform manual transmission or increasing or decreasing the gear stages.

In this case, the transmission lever simply serves to allow the driver to select a transmission stage, and a method for providing more diverse information via the transmission lever is required.

SUMMARY

The present disclosure has been devised to solve the above problems, and an object of the present disclosure is to provide a transmission device for a vehicle capable of allowing a driver to easily recognize the vehicle's state based on the position of a transmission operation unit, and an operating method for a transmission device. The objects of the present disclosure are not limited to the ones mentioned above, and other objects will be clearly understood by those skilled in the art from the following description.

According to an aspect of the present disclosure, a transmission device for a vehicle may include a vehicle state detector for detecting a vehicle state, the vehicle state including a first state which indicates that an ignition of a vehicle is off, and a second state which indicates that the ignition of the vehicle is on; a transmission operation unit for enabling a transmission operation of selecting one of a plurality of transmission stages; and a position adjusting unit for adjusting a position of the transmission operation unit based on the detected vehicle state to allow the transmission operation unit to slidingly move between a first position where the transmission operation is disabled and a second position where the transmission operation is enabled.

The first state may include a state in which an engine of an internal combustion engine vehicle is not running or a state in which an electric vehicle is not drivable, and the second state may include a state in which the engine of the internal combustion engine vehicle is running or a state in which the electric vehicle is drivable.

When the transmission operation unit is slidingly moved to the second position, a default transmission stage may be P or N stage, and another transmission stage may be selectable from the default transmission stage when at least one transmission condition is satisfied.

The first state may include an ignition preparation state which indicates that the ignition of the vehicle is off and the vehicle is expected to be driven.

The transmission operation unit may include a light emitting module for emitting light to form a lighting image of a predetermined shape. For example, the light emitting module may form a lighting image that performs a welcoming function in the first state and may form a lighting image that indicates a current transmission stage in the second state.

The position adjusting unit may move at least a portion of the transmission operation unit up or down with respect to a direction of sliding movement of the transmission operation unit to be disposed at the first position or the second position.

A transmission unit may further include a transmission unit coupled to the transmission operation unit for enabling the transmission operation via the transmission operation unit, and the transmission unit may be moved to have a position that corresponds to one of the first position or the second position by the position adjusting unit. In particular, the position adjusting unit may include a driving unit for generating a driving force for adjusting the position of the transmission operation unit, and a guide unit for guiding the position of the transmission operation unit to allow the position of the transmission operation unit to be adjusted due to the driving force of the driving unit.

Further, the guide unit may include a lead screw configured to be rotated about a rotation axis by the driving force of the driving unit, and a nut member configured to be moved along a direction of the rotation axis of the lead screw due to a rotation of the lead screw. The nut member may include a guide groove, into which a guide protrusion formed on the transmission unit is inserted to allow the transmission unit to slidingly move as the lead screw is rotated. The guide protrusion may move along a guide rail formed in a transmission housing as the lead screw rotates, and the guide rail may be formed so that both ends have different heights to cause the guide protrusions to be disposed at different heights in the first position and the second position with respect to the rotation axis of the lead screw. The guide groove may be formed to be elongated in one direction to allow the guide protrusion to move up or down with respect to the direction of the rotation axis of the lead screw.

According to another aspect of the present disclosure, a method of operating a transmission device of a vehicle may include detecting a vehicle state, the vehicle state including a first state which indicates that an ignition of the vehicle is off, and a second state which indicates that the ignition of the vehicle is on; and slidingly moving a transmission operation unit based on the detected vehicle state between a first position, in which a transmission operation is disabled, and a second position, in which the transmission operation is enabled to allow selection of one of a plurality of transmission stages.

The step of slidingly moving may include slidingly moving the transmission operation unit from the first position to the second position in response to detecting that the vehicle state is changed to the second state. The step of slidingly moving may further include moving at least a portion of the transmission operation unit up or down as the transmission operation unit is slidingly moved between the first position and the second position.

Further, the method may include forming a lighting image of a predetermined shape using a light emitting module provided in the transmission operation unit depending on whether the transmission operation unit is disposed at the first position or the second position. In particular, the step of forming the lighting image may include forming a lighting image that performs a welcoming function when the transmission operation unit is at the first position, and forming a lighting image that indicates a current transmission stage when the transmission operation unit is at the second position.

According to the vehicle transmission device of the present disclosure and operating method thereof as described herein, there are one or more of the following effects. Since the position of the transmission operation unit is adjusted so that the transmission operation unit has different positions depending on the vehicle state, the driver can easily recognize the vehicle state based on the position of the transmission operation unit, thereby improving the driver's convenience. Effects of the present disclosure are not limited to the effects mentioned above, and other effects not mentioned will be clearly understood by those skilled in the art from the description of the claims.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
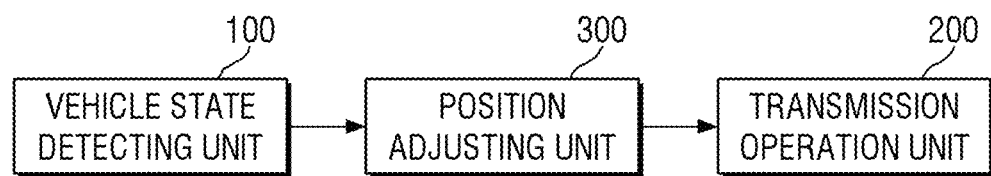
FIG. 1 is a block diagram showing the configuration of a vehicle transmission device according to an embodiment of the present disclosure.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. Throughout the specification, like reference numerals in the drawings denote like elements.

In some embodiments, well-known steps, structures and techniques will not be described in detail to avoid obscuring the disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Embodiments of the disclosure are described herein with reference to plan and cross-section illustrations that are schematic illustrations of idealized embodiments of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing. In the drawings, respective components may be enlarged or reduced in size for convenience of explanation.

Hereinafter, the present disclosure will be described with reference to the drawings for describing a transmission device for a vehicle and an operating method thereof according to embodiments of the present disclosure.

Figure 2:
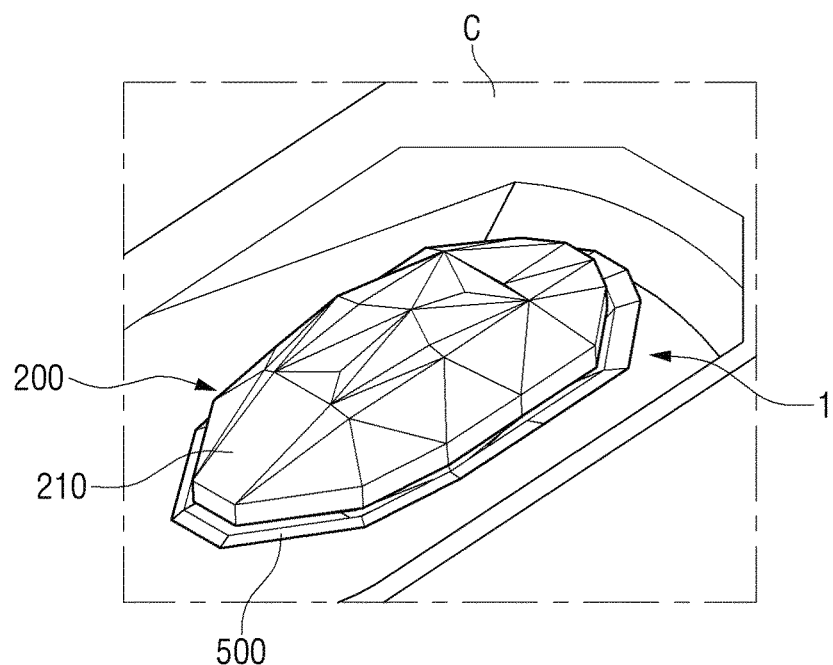
FIG. 2 is a schematic diagram illustrating a vehicle transmission device according to an embodiment of the present disclosure.
Figure 3:
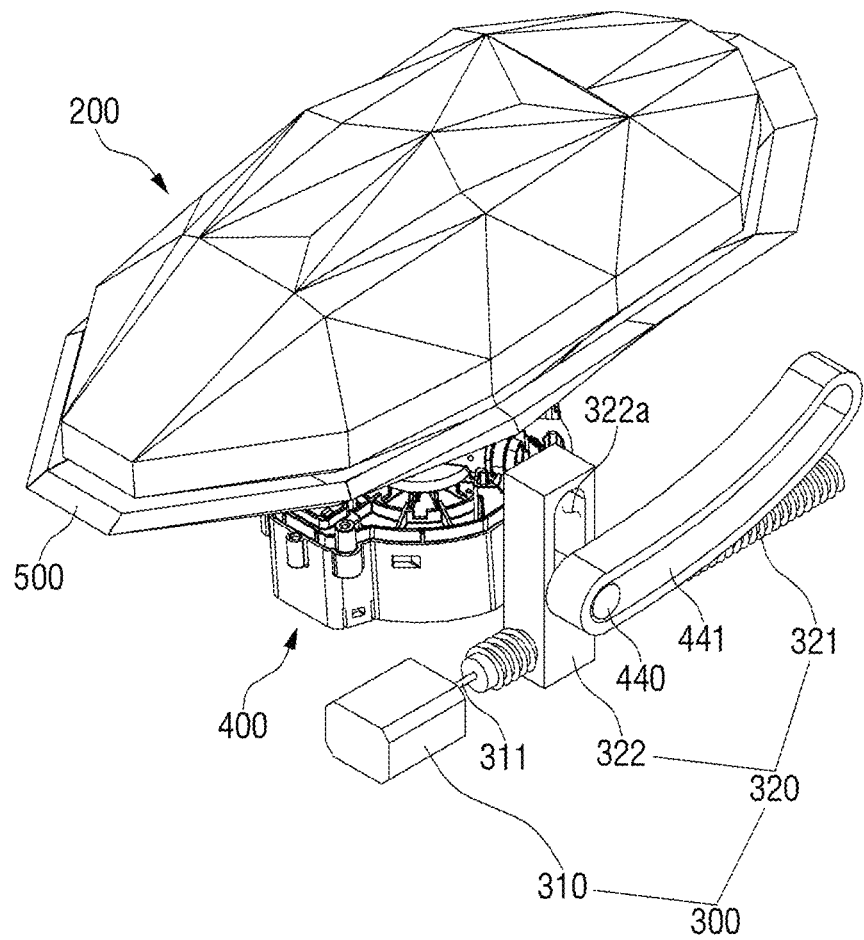
FIG. 3 is a perspective view illustrating a vehicle transmission device according to an embodiment of the present disclosure.
Figure 4:
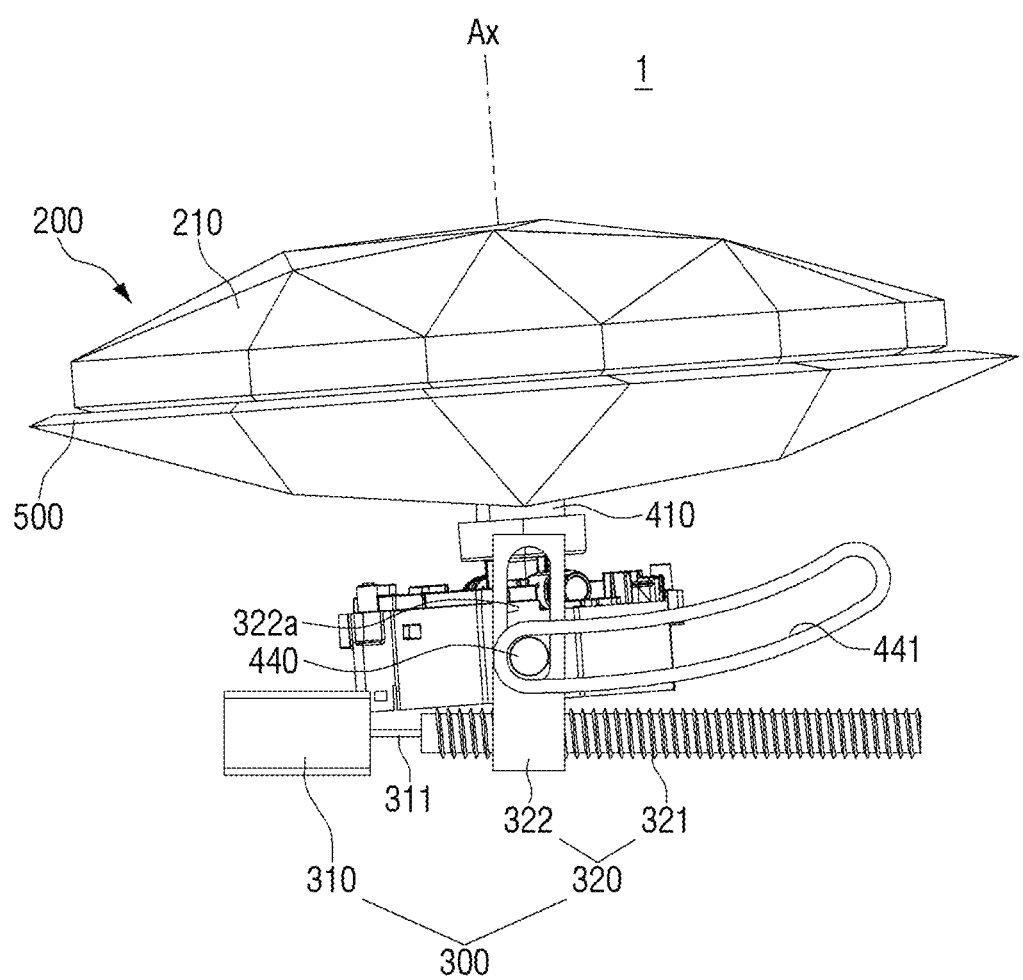
FIG. 4 is a side view showing a vehicle transmission device according to an embodiment of the present disclosure.
Figure 5:
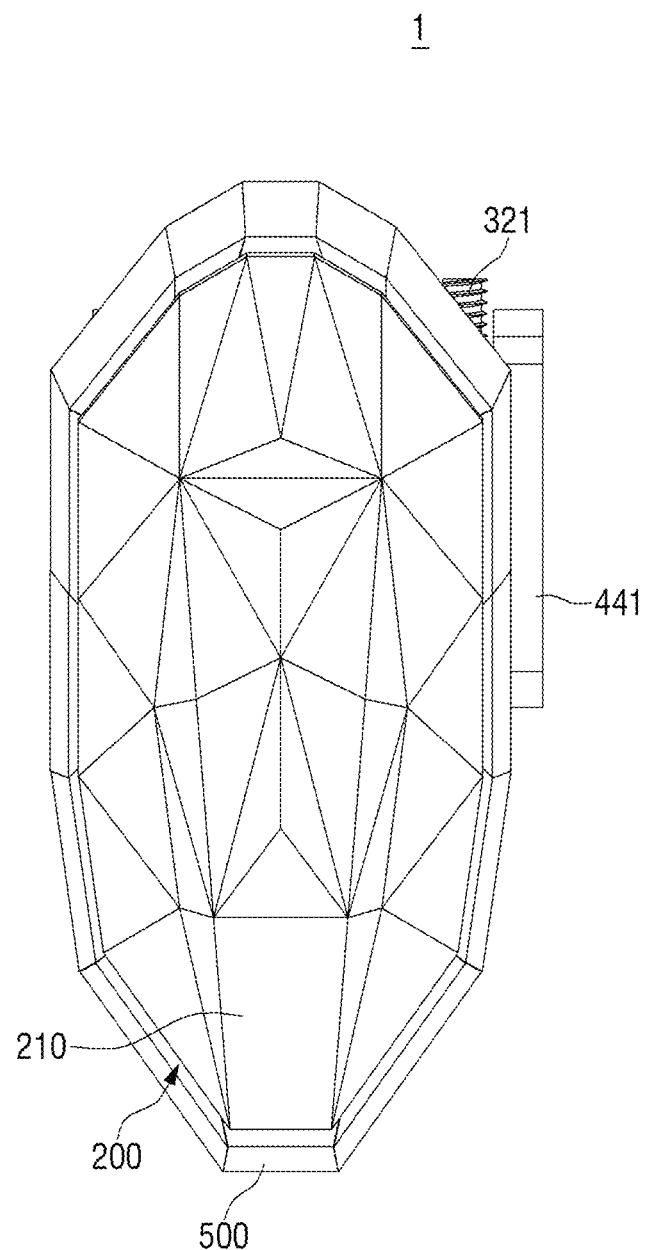
FIG. 5 is a plan view showing a vehicle transmission device according to an embodiment of the present disclosure.

FIG. 1 is a block diagram showing the configuration of a transmission device for a vehicle according to an embodiment of the present disclosure, FIG. 2 is a schematic diagram showing a transmission device for a vehicle according to an embodiment of the present disclosure, FIG. 3 is a perspective view showing a transmission device for a vehicle according to an embodiment of the present disclosure, FIG. 4 is a side view showing a transmission device for a vehicle according to an embodiment of the present disclosure, and FIG. 5 is a plan view showing a transmission device for a vehicle according to an embodiment of the present disclosure.

Referring to FIGS. 1 to 5, the vehicle transmission device 1 according to an embodiment of the present disclosure may include a vehicle state detector 100, a transmission operation unit 200, and a position adjusting unit 300.

In the embodiment of the present disclosure, an example in which the vehicle transmission device 1 is installed on the center console C between the center fascia and the console box of a vehicle will be described, but the present disclosure is not limited thereto. The vehicle transmission device 1 may be installed in various positions that can be easily accessed by a driver for transmission operation.

The vehicle state detector 100 may detect at least one state of the vehicle in order for activation of the transmission operation unit 200, and the activation of the transmission operation unit 200 may be understood that it is switched to a state that enables the driver to perform transmission operation.

In the embodiment of the present disclosure, an example in which the vehicle state detector 100 detects a plurality of different vehicle states will be described. This configuration may allow the transmission operation unit 200 to be disposed at any one of a plurality of different positions depending on the vehicle state detected by the vehicle state detector 100, and a detailed description thereof will be described later below.

The vehicle state detector 100 may detect a first state and a second state. In the first state, the ignition of the vehicle may be turned off or the vehicle may in in an ignition preparation state. In the second state, the ignition of the vehicle may be turned on. However, the vehicle state to be detected by the vehicle state detector 100 is not limited to the above-described examples, and the vehicle state to be detected by the vehicle state detector 100 may be added, deleted, or changed depending on a vehicle state that is required for activation of the transmission operation unit 200.

The first state may include a case, in which the ignition of the vehicle is turned off and the operation (e.g., driving) of the vehicle is not expected, and also a case, in which the operation (e.g., driving) of the vehicle is expected even though the ignition of the vehicle is turned off. The latter case may be referred to as a ignition preparation state.

In particular, the first state may be understood as a state when the engine is not operating for the case of internal combustion engine vehicles or a state when the vehicle is not drivable for the case of electric vehicles. The second state may be understood as a state when the engine is operating for the case of internal combustion engine vehicles or a state when the vehicle is drivable for the case of electric vehicles. In addition, the ignition preparation state may be understood as a state in which the driving of the vehicle is expected in the near future, such as when the vehicle's door opens, a driver with a smart key approaches the vehicle, a driver is detected within the vehicle, or the brake is applied, while the ignition of the vehicle is turned off.

The detection result of the vehicle state detector 100 may be delivered to a controller such as an ECU, and the controller may be configured to generate a control signal for adjusting the position of the transmission operation unit 200 based on the detected vehicle state.

The transmission operation unit 200 may enable the driver's transmission operation, and in particular, the position thereof may be adjusted depending on the vehicle state detected by the vehicle state detector 100 to allow the driver to recognize the vehicle state. The transmission operation unit 200 may be connected with a transmission unit 400 via a shaft 410 for a transmission function, and as the transmission operation unit 200 rotates about a rotation axis Ax, one of the plurality of transmission stages may be selected.

In the embodiment of the present disclosure, as the transmission operation unit 200 rotates in the first direction, the transmission stage may be selected in the order of reverse (R), neutral (N), and drive (D) stages, and as the transmission operation unit 200 rotates in the second direction, the transmission stage may be selected in the order of D, N, and R. However, the present disclosure is not limited thereto, and the selectable transmission stages may be variously changed based on the rotation of the transmission operation unit 200, and additionally, some transmission stages such as the parking (P) stage may be selected by a button or a switch provided separately from the transmission operation unit 200. In addition, in the embodiment of the present disclosure, a case in which the first direction is a clockwise direction and the second direction is a counterclockwise direction will be described as an example.

The transmission unit 400 may output a transmission signal that corresponds to the position of the transmission operation unit 200, and the transmission signal output from the transmission unit 400 may be delivered to a transmission system to cause the transmission stages to be selected in accordance with the stage selected by the transmission operation unit 200.

Figure 6:
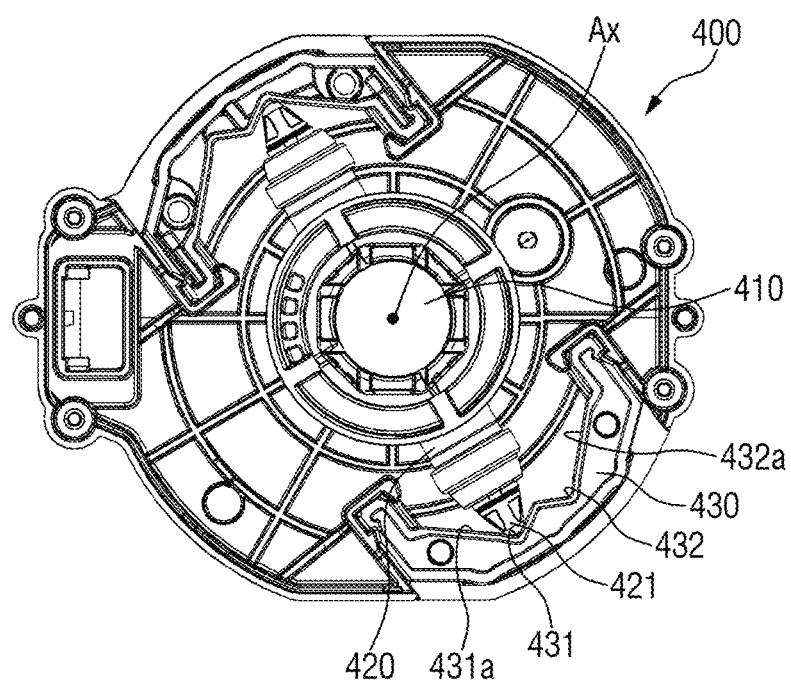
FIGS. 6 to 8 are plan views showing a transmission unit according to an embodiment of the present disclosure.
Figure 7:
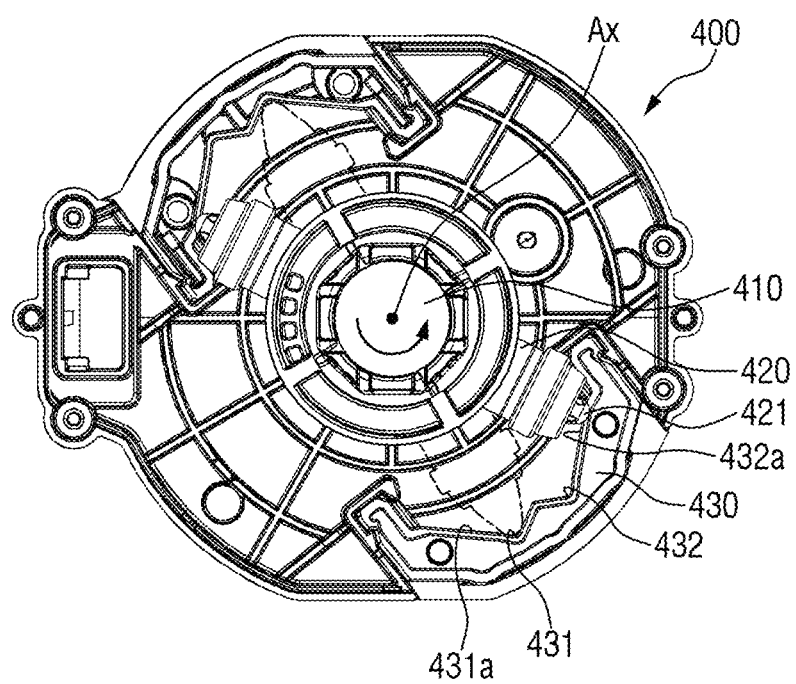
Figure 8:
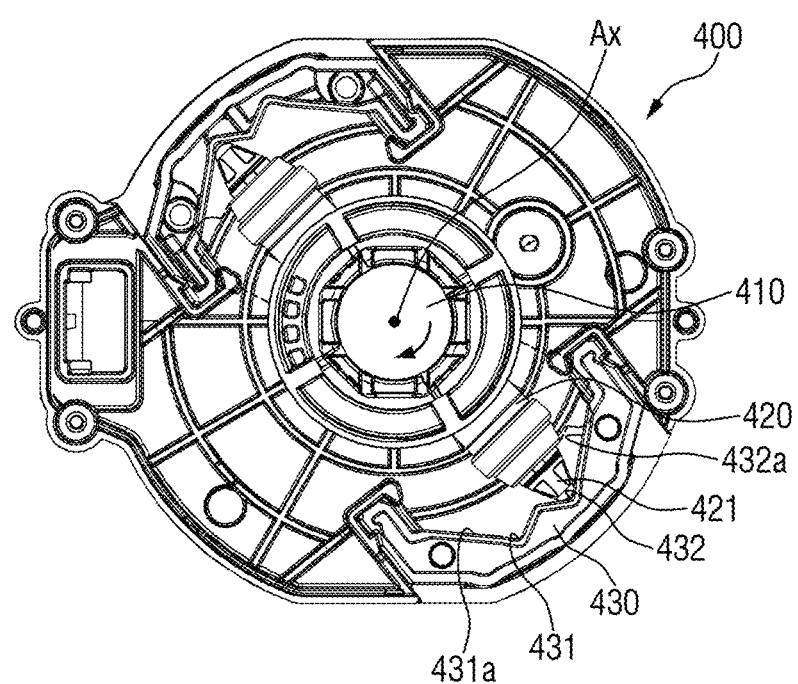
Figure 9:
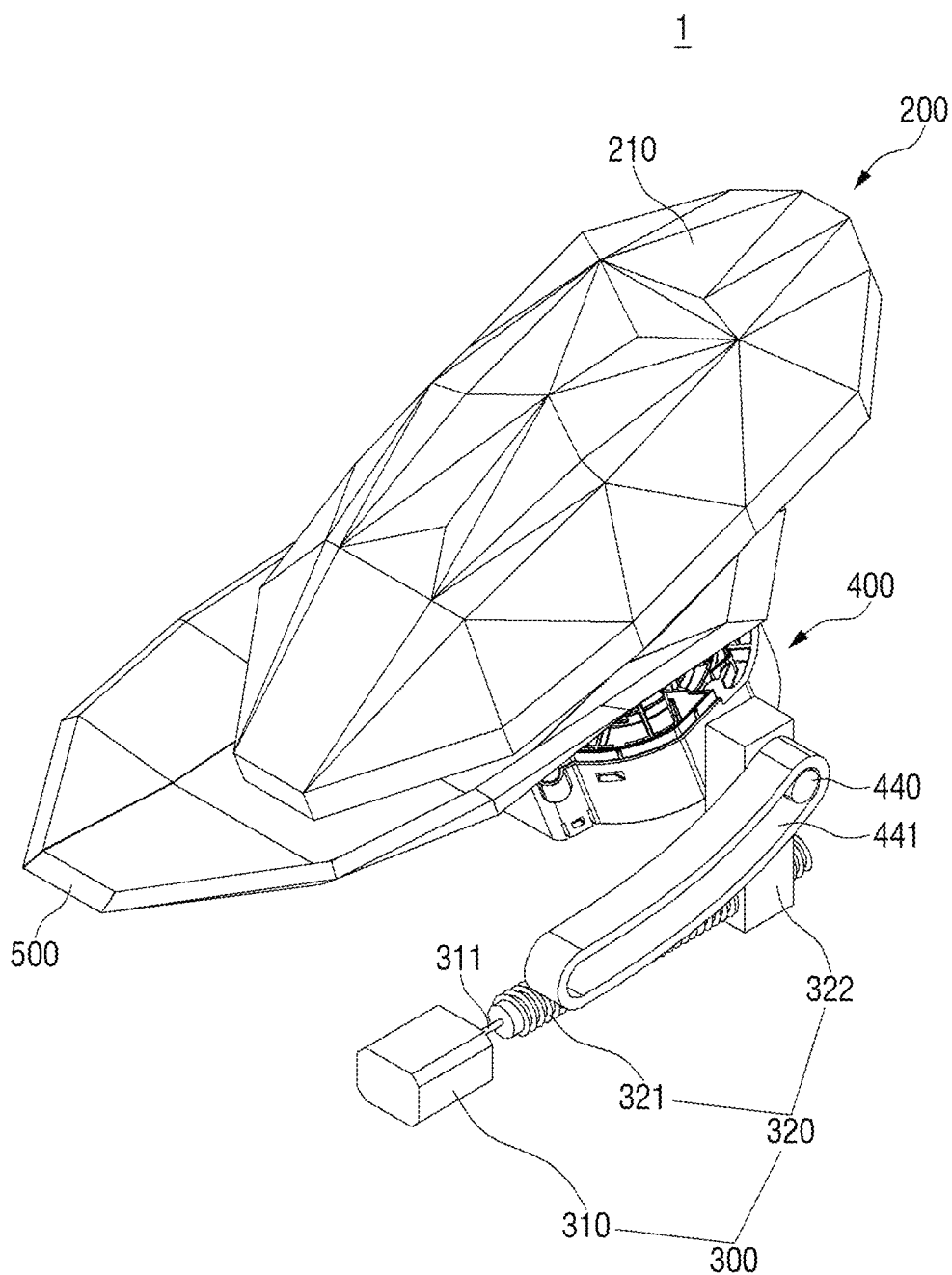
FIG. 9 is a perspective view illustrating a vehicle transmission device, in which a transmission operation unit is disposed at a second position, according to an embodiment of the present disclosure.
Figure 10:
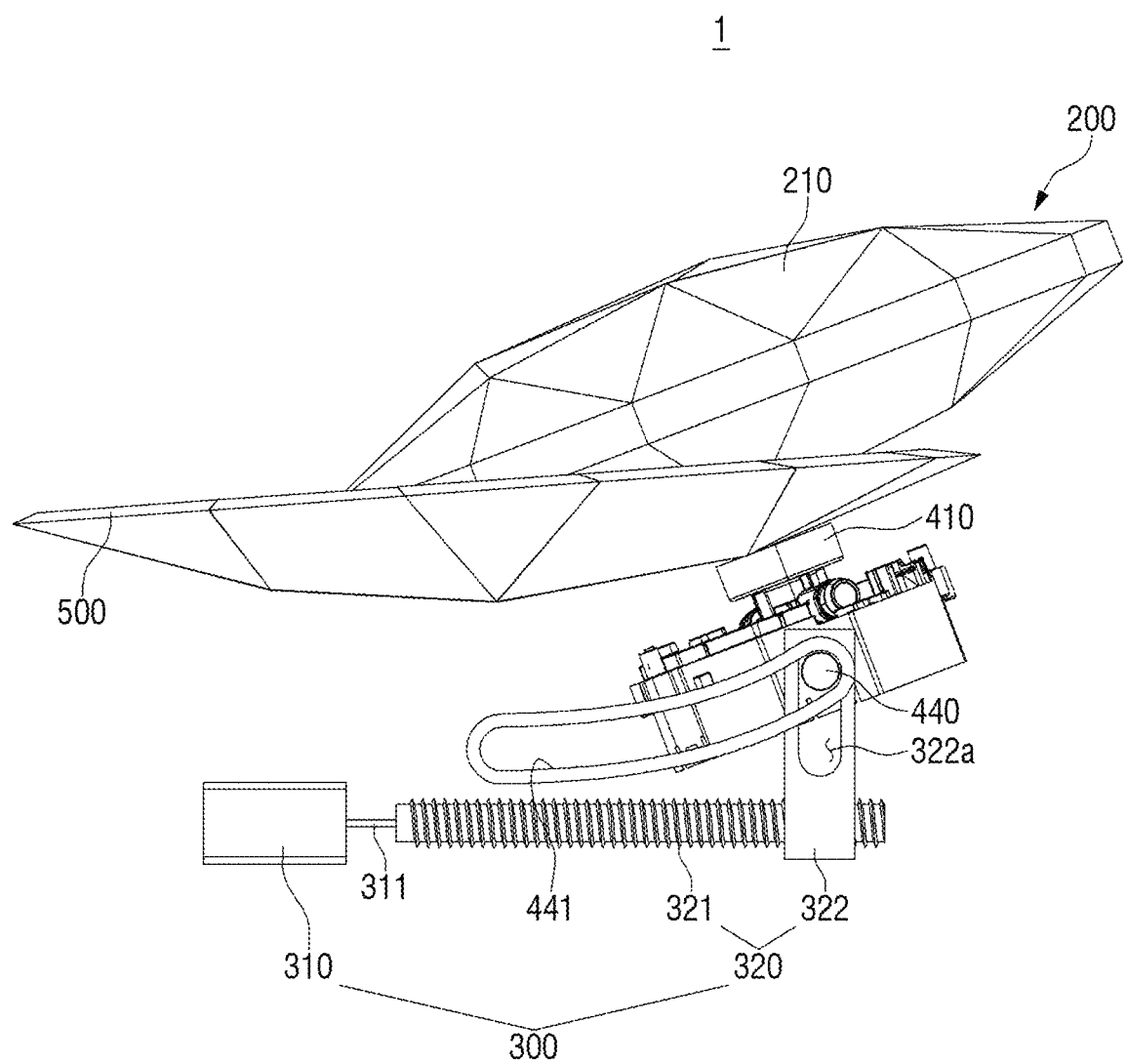
FIG. 10 is a side view illustrating a vehicle transmission device, in which a transmission operation unit is disposed at a second position, according to an embodiment of the present disclosure.
Figure 11:
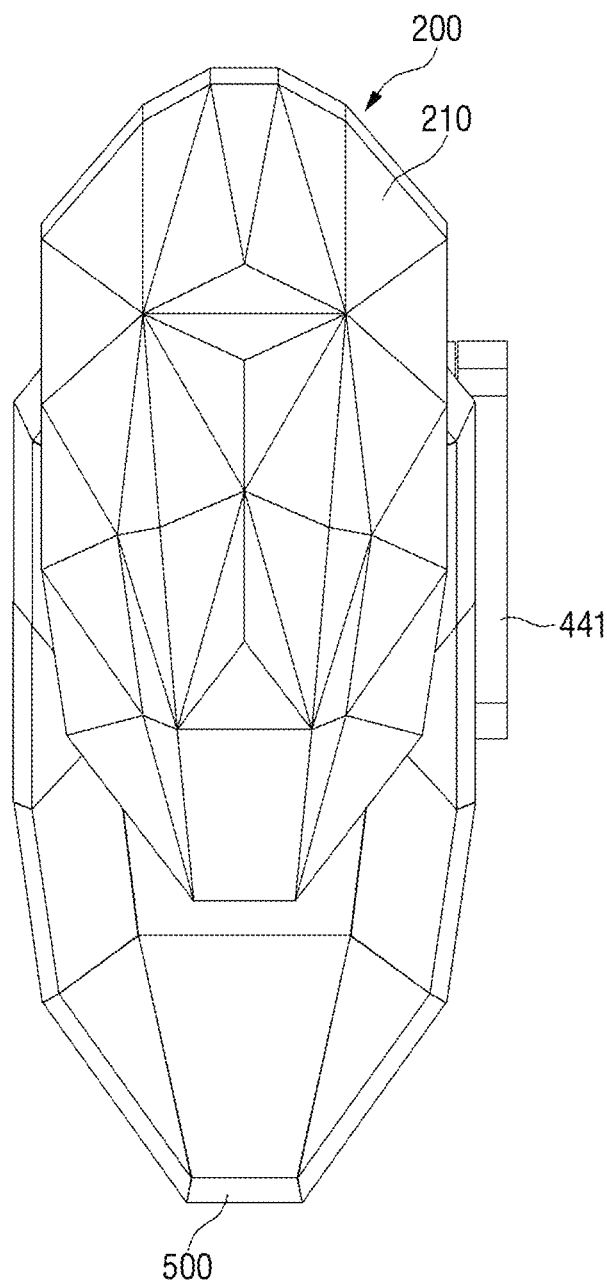
FIG. 11 is a plan view illustrating a transmission device for a vehicle, in which a transmission operation unit is disposed at a second position, according to an embodiment of the present disclosure.
Figure 12:
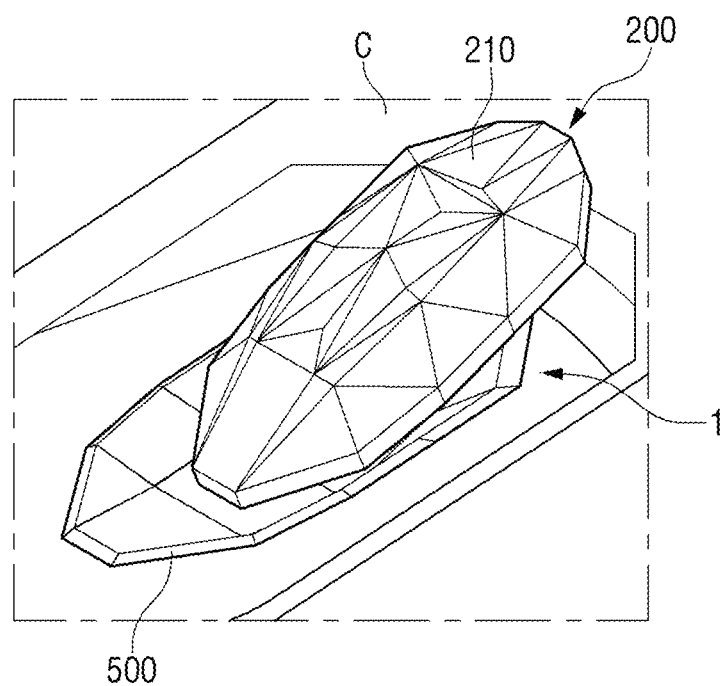
FIG. 12 is a schematic diagram illustrating a vehicle transmission device including a transmission operation unit whose position is adjusted from a first position to a second position, according to an embodiment of the present disclosure.

FIGS. 6 to 8 are plan views illustrating a transmission unit according to an embodiment of the present disclosure. Referring to FIGS. 6 to 8, the transmission unit 400 according to an embodiment of the present disclosure may include a rotating member 420 that rotates integrally with the shaft 410 and a detent groove 430 that generates a feeling of operation (e.g., haptic feedback) when the rotating member 420 is rotated.

When the transmission operation unit 200 is rotated, since the rotation member 420 is rotated by the rotation of the shaft 410 that is coupled to the transmission operation unit 200, and a bullet 421 disposed at an end of the rotation member 420 moves while maintaining contact with the detent groove 430, the feeling of operation may be generated according to the shape of the contact surface of the bullet 421 in the detent groove 430. In particular, since the bullet 421 is elastically supported along the radial direction with respect to the rotation axis Ax by an elastic member (e.g., a coil spring disposed within a cavity formed in the rotation member 420 while applying an elastic force against the bullet 421 inserted in the rotation member 420), it is possible to maintain a state in contact with the detent groove 430 when the shaft 410 rotates.

The detent groove 430 may generate the feeling of operation when the transmission operation unit 200 rotates, and may also return the transmission operation unit to a resting position (e.g., a default position) to select a transmission stage when an external force is applied to the transmission operation unit 200 is removed. More specifically, the resting position refers to a position at which the transmission operation unit 200 rests without an external force being applied thereto, and if the positions to be returned are the same when the external force applied to the transmission operation unit 200 is removed regardless of the rotation direction of the transmission operation unit 200, the resting position may have one position. If the positions to be returned are different when the external force applied to the transmission operation unit 200 is removed, the resting position may have two or more different positions.

Hereinafter, in the embodiment of the present disclosure, an example in which the resting position of the transmission operation unit 200 is different depending on the rotation direction of the transmission operation unit 200 will be described, and accordingly, the resting position of the transmission operation unit 200 is referred to a NULL stage, which may correspond to the transmission stage selected immediate prior to returning to the resting position.

In particular, FIGS. 6 to 8 show an example in which a plurality of detent grooves 431 and 432 respectively corresponding to Nr and Nd stages are included as the NULL stage. As such, when the external force is removed after the transmission operation unit 200 is rotated to the D stage, the bullet 421 may return to the detent groove 431 that corresponds to the Nd stage among the plurality of detent grooves 431 and 432 due to, for example, the spring action of the elastic member disposed within the rotation member 420. On the other hand, when the external force is removed after the transmission operation unit 200 is rotated to the R stage, the bullet 421 may return to the detent groove 432 that corresponds to the Nr stage among the plurality of detent grooves 431 and 432.

Both the Nd and Nr stages may be understood as the N stage, and in response to the external force applied to the transmission operation unit 200 being removed (i.e., when the driver releases the transmission operation unit 200 after turning it toward the right end or the left lend), the transmission operation unit 200 may be returned to the resting position, the transmission stage may be selected based on the above-described order of transmission stage selection.

For example, when the transmission operation unit 200 is rested at the Nd stage after the transmission operation unit 200 is rotated in the first direction to select the D stage and then is released, the driver may rotate the transmission operation unit 200 in the second direction to select the transmission stage in the order of Nr and R stages. On the other hand, when the transmission operation unit 200 is rested at the Nr stage after the transmission operation unit 200 is rotated in the second direction to select the R stage and then is released, the driver may rotate the transmission operation unit 200 in the first direction to select the transmission stage in the order of Nd and D stages. Accordingly, the Nd and D stages may be understood to have the same rotation direction but different rotation angles for the transmission operation unit 200, and similarly, Nr and R stages may be also understood to have the same rotation direction but different rotation angles for the transmission operation unit 200.

A first contact surface 431a may be formed in the first direction from the detent groove 431 that corresponds to the Nd stage among the plurality of detent grooves 431 and 432, and a second contact surface 432a may be formed in the second direction from the detent groove 432 that corresponds to the Nr stage.

The first contact surface 431 may be formed to be radially closer to the rotation axis Ax of the transmission operation unit 200 as it moves away from the detent groove 431 that corresponds to the Nd stage, and similarly, the second contact surface 432 may be formed to be radially closer to the rotation axis Ax of the transmission operation unit 200 as it moves away from the detent groove 432 that corresponds to the Nr stage. As the position of the bullet 421 in contact with the first contact surface 431a or the second contact surface 432a becomes closer to the rotation axis Ax, the elastic deformation of the elastic member that elastically supports the bullet 421 may increase, leading to increase of the restoring force. In turn, the increased restoring force may act to return the bullet 421 to one of the plurality of detent grooves 431 and 432 in response to the external force being removed.

FIG. 6 shows an example, in which the bullet 421 is inserted and disposed in the detent groove that corresponds to the Nd stage among the plurality of detent grooves 431 and 432. In this case, as shown in FIG. 7, if the external force is applied to rotate the transmission operation unit 200 in the second direction to select the R stage, and then is removed, the bullet 421 may be returned to be inserted into and disposed at the detent groove 432 that corresponds to the Nr stage among a plurality of detent grooves 431 and 432.

In the above-described embodiment, an example in which the transmission operation unit 200 is returned to the resting position when the external force applied to the transmission operation unit 200 to select the transmission stage is removed has been described, but the present disclosure is not limited thereto. In some embodiments, the transmission operation unit 200 may maintain a position that corresponds to the selected transmission stage, and in this case, an additional detent groove that corresponds to the selected transmission stage may be formed along the rotation direction of the transmission operation unit 200.

The position of the transmission operation unit 200 may be adjusted to a first position or a second position. Hereinafter, the first position may collectively refer to a state in which a transmission operation is not required, that is, a position of the transmission operation unit 200 that disables the driver's transmission operation, and the second position may collectively refer to a state in which a transmission operation is required, that is, the position of the transmission operation unit 200 that enables the driver' transmission operation.

In the embodiment of the present disclosure, when the vehicle ignition is turned on, the transmission operation unit 200 may be switched to the second position so that the driver can easily recognize that the ignition of the vehicle is turned on. In other words, in the case of an internal combustion engine vehicle, when the ignition of the vehicle is turned on, the driver can recognize that the ignition of the vehicle is turned on due to the engine noise or vibration, or the like, whereas in the case of electric vehicles, which use the driving force of the motor as a power source, vibration or the like is not generated. As such, it may be more difficult for the driver to recognize whether the ignition of the vehicle is turned on. Thus, in the embodiment of the present disclosure, when the ignition of the vehicle is turned on, the position of the transmission operation unit 200 may be changed so that the driver can easily recognize that the vehicle's ignition is turned on in the electric vehicles, as well as in the internal combustion engine vehicles.

The position adjusting unit 300 may adjust the position of the transmission operation unit 200 so that the transmission operation unit 200 may be slidingly moved to the first position or the second position according to a control signal from the controller. In the embodiment of the present disclosure, an example in which when the transmission operation unit 200 is slidingly moved to the second position, the default transmission stage is P or N stage will be described. Further, an example in which when at least one transmission condition such as the vehicle speed, application of the brake, or the like is satisfied, selection of another transmission stage is possible will be described.

The position adjusting unit 300 may include a driving unit 310 and a guide unit 320. The driving unit 310 may generate a driving force for adjusting the position of the transmission operation unit 200, and the guide unit 320 may adjust the position of the transmission operation unit 200 by the driving force from the driving unit 310. When a driving force is generated from the driving unit 310, the guide unit 320 may allow the transmission operation unit 200 to be slidingly moved. Hereinafter, an example in which the transmission operation unit 200 is slidingly moved substantially in the horizontal direction by the guide unit 320 will be described.

In other words, the transmission operation unit 200 may be seated on a seating cover 500 that allows the transmission operation unit 200 to be seated at the first position and prevents the inside components from being visible to the outside. At the second position, at least a portion of the transmission operation unit 200 may be disposed so as to be exposed from the seating cover 500 so that the driver can grab the transmission operation unit 200 to perform the transmission operation. In this case, an opening that enables sliding movement of the transmission operation unit 200 may be formed in the seating cover 500, and the shaft 410 may be connected to the transmission operation unit 200 through the opening.

Further, at the second position, the guide unit 320 may allow at least a portion of the transmission operation unit 200 to be disposed at a different height than the first position in a direction perpendicular to the direction of the sliding movement of the transmission operation unit 200, so that the driver can more easily grab the transmission operation unit 200 to perform the transmission operation.

For example, since it is difficult for the driver to hold the transmission operation unit 200 when the entirety of the transmission operation unit 200 is seated on (e.g., abutting) the seating cover 500, in the embodiment of the present disclosure, the transmission operation unit 200 may be slidingly moved so that at least a portion thereof may be raised to allow the driver to grab the transmission operation unit 200 more easily and to perform the transmission operation.

The guide unit 320 may include a lead screw 321 and a nut member 322. The lead screw 321 may be rotated with respect to the rotation axis 311 of the driving unit 310, and the nut member 322 may be moved along the rotation axis direction of the lead screw 321 when the lead screw 321 rotates. In addition, the nut member 322 may include a guide groove 322a, in which the guide protrusion 440 that is formed on the transmission unit 400 is inserted and disposed. Accordingly, as the nut member 322 moves along the rotation axis direction of the lead screw 321, the transmission operation unit 200 may be slidably moved in the direction of the rotation axis of the lead screw 321.

At this time, the guide protrusion 440 may move along the guide rail 441 formed in the transmission housing (not shown), and both ends of the guide rail 441 may be formed to have different heights with respect to the rotation axis of the lead screw 321, and the guide protrusion 440 may have different heights when disposed at a proximate end of the guide rail 441 and when disposed at a distal end of the guide rail 500.

In addition, as the both ends of the guide rail 441 are formed to have different heights, the guide groove 322a formed in the nut member 322 may be formed to be elongated in the vertical direction so that the guide protrusion 440 can be moved up and down in the vertical direction with respect to the nut member 322.

At this time, the upward and downward movement of the guide protrusion 440 is merely an example since the guide protrusion 440 slidingly moves in the horizontal direction. However, the direction, in which the guide protrusion 440 actually moves up and down, may vary depending on the sliding direction of the guide protrusion 440.

Therefore, when the transmission operation unit 200 is at the first position, the guide protrusion 440 may be disposed at the proximate end of the guide rail 441, and at the same time disposed at the lower end of the guide groove 332a. When the transmission operation unit 200 is moved to the second position by the position adjusting unit 300, the guide protrusion 440 may be disposed at the distal end of the guide rail 441, and at the same time, at the upper end of the guide groove 332a, as shown in FIGS. 9 to 12. Such a configuration may allow the driver to hold the transmission operation unit 200 more easily to perform transmission operation.

Figure 13:
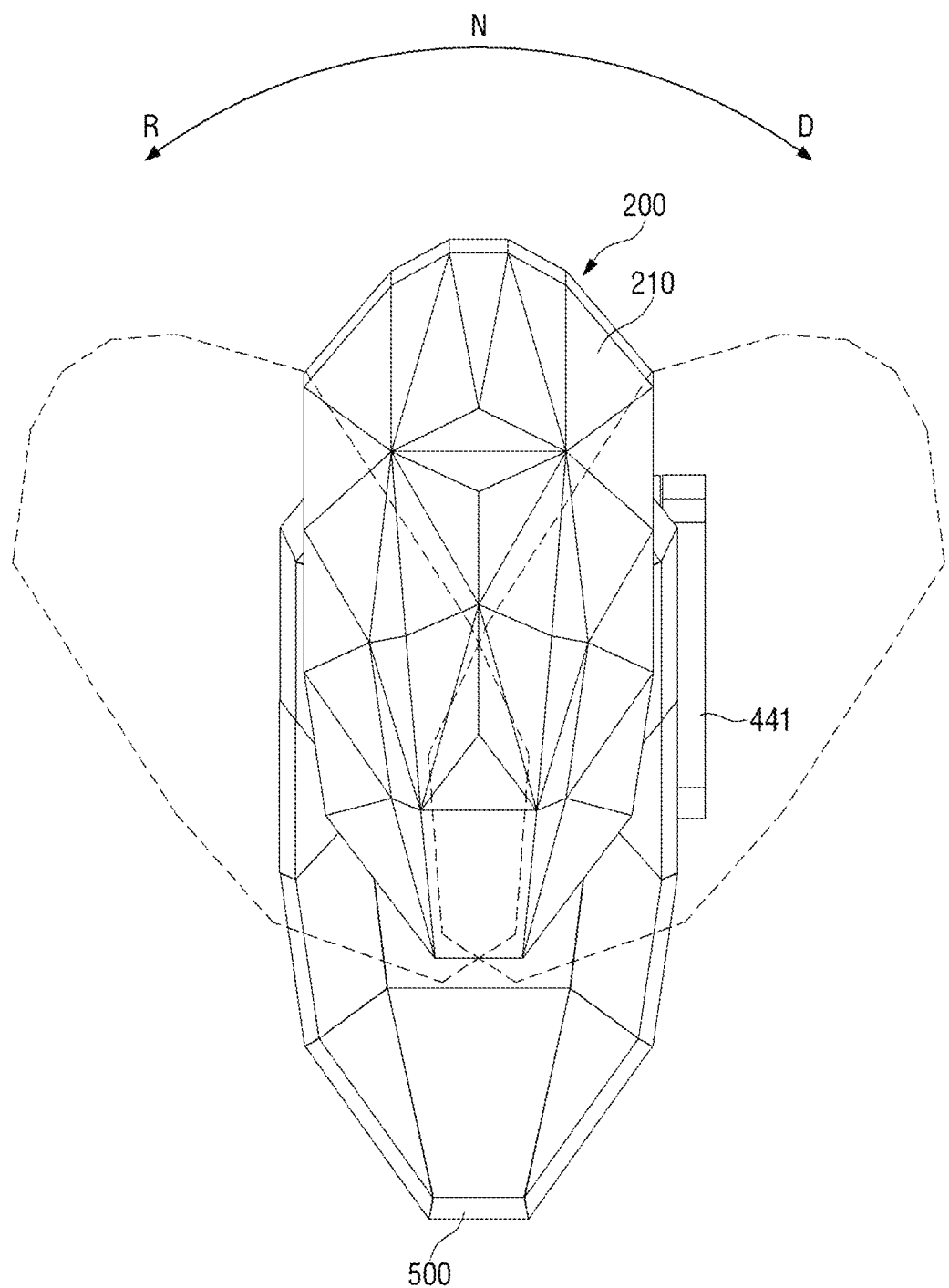
FIG. 13 is a schematic diagram illustrating an operation method of a transmission operation unit, according to an embodiment of the present disclosure.

As described above, when the position of the transmission operation unit 200 is adjusted from the first position to the second position, the driver may hold the transmission operation unit 200 and may rotate it in the first direction or the second direction with respect to the axis of rotation Ax to select R, N, or D stages, as shown in FIG. 13.

In addition, the transmission operation unit 200 may include a light emitting module 210 for forming a lighting image of a predetermined shape. For example, the light emitting module 210 may form a lighting image for a welcoming function that facilitates communication between the vehicle and the driver by letting the vehicle to react as if welcoming the driver in the first state. In this case, the light emitting module 210 may form a lighting image having at least one color in at least some portion.

Figure 14:
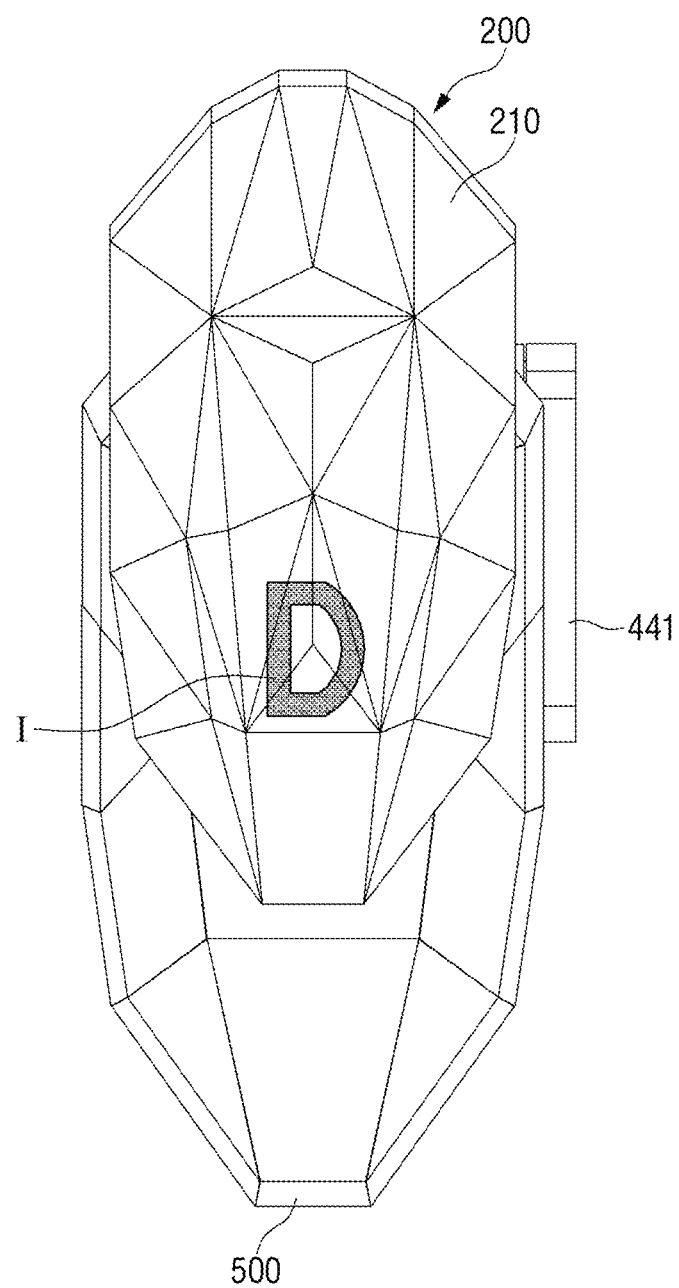
FIG. 14 is a schematic diagram illustrating a lighting image formed by a light emitting module of a transmission operation unit, according to an embodiment of the present disclosure.

In the second state, the light emitting module 210 may display a lighting image I that indicates the current transmission stage so as to aid the driver to more easily recognize the current transmission stage selected by the driver, as shown in FIG. 14. FIG. 14 is an example where the D stage is selected.

On the other hand, when the ignition of the vehicle is turned off due to the end of vehicle driving, the light emitting module 210 may forms a lighting image of a predetermined color so that the driver can recognize that the vehicle ignition is turned off, and/or may gradually increase or decrease the brightness of the lighting image.

In the above-described embodiment, although an example in which when the ignition of the vehicle is turned on, the transmission operation unit 200 is slidingly moved by the guide unit 320, and at the same time, at least a portion thereof is raised and lowered so that the transmission operation unit 200 is disposed at the first position or the second position has been described. However, this is only an example for helping understanding of the present disclosure, and the present disclosure is not limited thereto. The sliding movement of the transmission operation unit 200 may be omitted, and the transmission operation unit 200 may be raised and lowered depending on the first position and the second position. In some embodiments, the raising and lowering of the transmission operation unit 200 may be omitted, and the transmission operation unit 200 may be slidingly moved to the first position and the second position without substantially changing its height.

In the above-described the vehicle transmission device 1 of the present disclosure, the transmission operation unit 200 has different positions depending on the vehicle state, so that the driver can easily recognize the on/off state of the ignition of the vehicle in an electric vehicle as well as in an internal combustion engine vehicle. Therefore, the driver may more easily recognize that the ignition of the vehicle is turned on, such as in an electric vehicle, and such a function may prevent accidents against humans and vehicles due to the driver's inability to recognize the ignition.

In concluding the detailed description, those skilled in the art will appreciate that many variations and modifications can be made to the exemplary embodiments without substantially departing from the principles of the present disclosure. Therefore, the disclosed exemplary embodiments of the disclosure are used in a generic and descriptive sense only and not for purposes of limitation.

What is claimed is:

1. A transmission device for a vehicle, comprising:
a transmission operation unit for enabling a transmission operation of selecting one of a plurality of transmission stages;
a position adjusting unit for adjusting a position of the transmission operation unit to allow the transmission operation unit to slidingly move between a first position where the transmission operation is disabled and a second position where the transmission operation is enabled depending on whether the vehicle is in a first state or a second state, wherein the first state includes a state in which an engine of an internal combustion engine vehicle is not running or a state in which an electric vehicle is not drivable, and the second state includes a state in which the engine of the internal combustion engine vehicle is running or a state in which the electric vehicle is drivable; and
a seating cover disposed between the transmission operation unit and the position adjusting unit for allowing the transmission operation unit to be seated thereon at the first position,
wherein, while the transmission operation unit is moved from the first position to the second position, the transmission operation unit is subject to a combination of a translational motion and a rotational motion with respect to the seating cover.

2. The transmission device of claim 1, wherein when the transmission operation unit is slidingly moved to the second position, a default transmission stage is P or N stage, and
wherein another transmission stage is selectable from the default transmission stage when at least one transmission condition is satisfied.

3. The transmission device of claim 1, wherein the first state includes an ignition preparation state which indicates that the ignition of the vehicle is off and the vehicle is expected to be driven.

4. The transmission device of claim 1, wherein the transmission operation unit includes a light emitting module for emitting light to form a lighting image of a predetermined shape.

5. The transmission device of claim 4, wherein the light emitting module forms a lighting image that performs a welcoming function in the first state and forms a lighting image that indicates a current transmission stage in the second state.

6. The transmission device of claim 1, wherein the position adjusting unit moves at least a portion of the transmission operation unit up or down with respect to a direction of sliding movement of the transmission operation unit to be disposed at the first position or the second position.

7. The transmission device of claim 1, further comprising:
a transmission unit coupled to the transmission operation unit for enabling the transmission operation via the transmission operation unit,
wherein the transmission unit is moved to have a position that corresponds to one of the first position or the second position by the position adjusting unit.

8. The transmission device of claim 7, wherein the position adjusting unit comprises:
a driving unit for generating a driving force for adjusting the position of the transmission operation unit; and
a guide unit for guiding the position of the transmission operation unit to allow the position of the transmission operation unit to be adjusted due to the driving force of the driving unit.

9. The transmission device of claim 8, wherein the guide unit comprises:
a lead screw configured to be rotated about a rotation axis by the driving force of the driving unit; and
a nut member configured to be moved along a direction of the rotation axis of the lead screw due to a rotation of the lead screw.

10. The transmission device of claim 9, wherein the nut member includes a guide groove, into which a guide protrusion formed on the transmission unit is inserted to allow the transmission unit to slidingly move as the lead screw is rotated.

11. The transmission device of claim 10, wherein the guide protrusion moves along a guide rail formed in a transmission housing as the lead screw rotates, and
wherein the guide rail is formed so that both ends have different heights to cause the guide protrusions to be disposed at different heights in the first position and the second position with respect to the rotation axis of the lead screw.

12. The transmission device of claim 10, wherein the guide groove is formed to be elongated in one direction to allow the guide protrusion to move up or down with respect to the direction of the rotation axis of the lead screw.

13. A method of operating a transmission device of a vehicle, comprising:
detecting whether the vehicle is in a first state or a second state, wherein the first state includes a state in which an engine of an internal combustion engine vehicle is not running or a state in which an electric vehicle is not drivable, and the second state includes a state in which the engine of the internal combustion engine vehicle is running or a state in which the electric vehicle is drivable; and
slidingly moving a transmission operation unit between a first position, in which a transmission operation is disabled, and a second position, in which the transmission operation is enabled to allow selection of one of a plurality of transmission stages depending on whether the vehicle is in the first state or the second state,
wherein, while the transmission operation unit is moved from the first position to the second position, the transmission operation unit is subject to a combination of a translational motion and a rotational motion with respect to a seating cover disposed under the transmission operation unit.

14. The method of claim 13, wherein the slidingly moving comprises slidingly moving the transmission operation unit from the first position to the second position in response to detecting that the vehicle is changed to the second state.

15. The method of claim 13, wherein the slidingly moving further comprises moving at least a portion of the transmission operation unit up or down as the transmission operation unit is slidingly moved between the first position and the second position.

16. The method of claim 13, further comprising:
forming a lighting image of a predetermined shape using a light emitting module provided in the transmission operation unit depending on whether the transmission operation unit is disposed at the first position or the second position.

17. The method of claim 16, wherein the forming the lighting image comprises:
forming a lighting image that performs a welcoming function when the transmission operation unit is at the first position; and
forming a lighting image that indicates a current transmission stage when the transmission operation unit is at the second position.

18. A transmission device for a vehicle, comprising:
a transmission operation unit for enabling a transmission operation of selecting one of a plurality of transmission stages;
a position adjusting unit for adjusting a position of the transmission operation unit to allow the transmission operation unit to slidingly move between a first position where the transmission operation is disabled and a second position where the transmission operation is enabled depending on whether the vehicle is in a first state or a second state, wherein the first state includes a state in which an engine of an internal combustion engine vehicle is not running or a state in which an electric vehicle is not drivable, and the second state includes a state in which the engine of the internal combustion engine vehicle is running or a state in which the electric vehicle is drivable; and
a transmission unit coupled to the transmission operation unit for enabling the transmission operation via the transmission operation unit, the transmission unit being configured to be moved between the first position and the second position by the position adjusting unit,
wherein the position adjusting unit comprises:
a driving unit for generating a driving force for adjusting the position of the transmission operation unit; and
a guide unit for guiding the position of the transmission operation unit to allow the position of the transmission operation unit to be adjusted due to the driving force of the driving unit,
wherein the guide unit comprises:
a lead screw configured to be rotated about a rotation axis by the driving force of the driving unit; and
a nut member configured to be moved along a direction of the rotation axis of the lead screw due to a rotation of the lead screw, and
wherein the nut member includes a guide groove, into which a guide protrusion formed on the transmission unit is inserted to allow the transmission unit to slidingly move as the lead screw is rotated.

19. The transmission device of claim 18, wherein the guide protrusion moves along a guide rail formed in a transmission housing as the lead screw rotates, and
wherein the guide rail is formed so that both ends have different heights to cause the guide protrusions to be disposed at different heights in the first position and the second position with respect to the rotation axis of the lead screw.

20. The transmission device of claim 18, wherein the guide groove is formed to be elongated in one direction to allow the guide protrusion to move up or down with respect to the direction of the rotation axis of the lead screw.

* * * * *